United States Patent [19]

Kiger

[11] Patent Number: 4,867,246
[45] Date of Patent: Sep. 19, 1989

[54] GARDENING GLOVE WITH ATTACHED FINGERTIP CUPS

[76] Inventor: Carrie A. Kiger, 691 Wiltshire Rd., Fayetteville, N.C. 28304

[21] Appl. No.: 163,774

[22] Filed: Mar. 3, 1988

[51] Int. Cl.$^4$ .............................................. A01B 1/06
[52] U.S. Cl. ................................... 172/370; 2/161 R; 294/25
[58] Field of Search ........................ 172/370; 294/25; 2/DIG. 6, 161 R, 161 A, 160, 163

[56] References Cited

U.S. PATENT DOCUMENTS

| | | |
|---|---|---|
| 275,463 | 4/1883 | Burnes ................................ 172/370 |
| 474,929 | 5/1892 | Tabor et al. . |
| 622,386 | 4/1899 | Peer ..................................... 294/25 |
| 1,055,838 | 3/1913 | Torrance .............................. 170/370 |
| 1,358,824 | 11/1920 | Burden . |
| 2,409,101 | 10/1946 | Brittingham ......................... 170/370 |
| 2,717,546 | 9/1955 | Ryden . |
| 2,740,968 | 4/1956 | Gardocki ............................. 2/161 A |
| 2,954,832 | 10/1960 | Pirone . |
| 3,593,803 | 7/1971 | Ibach ................................... 172/370 |
| 4,131,952 | 1/1979 | Brenning, Jr. . |
| 4,149,601 | 4/1979 | Taylor ................................. 172/370 |
| 4,203,495 | 5/1930 | Crownover . |
| 4,247,097 | 1/1981 | Schwartz ............................. 2/160 |
| 4,474,246 | 10/1984 | Arroyo ................................ 172/370 |

FOREIGN PATENT DOCUMENTS

| | | | |
|---|---|---|---|
| 2239464 | 2/1974 | Fed. Rep. of Germany ........ 294/25 |
| 323863 | 1/1930 | United Kingdom ................ 172/370 |

*Primary Examiner*—Richard J. Johnson
*Attorney, Agent, or Firm*—Fleit, Jacobson, Cohn, Price, Holman & Stern

[57] ABSTRACT

A gardening glove which snugly fits on the hand with each finger and thumb stall including rigid cup-like or claw-like projections generally configured to simulate long fingernails which project beyond the tip ends of the finger and thumb stalls for effectively digging in the soil around desired plants in order to remove undesirable weeds and the like and to aerate the soil. The hard, rigid projections are attachable to the exterior surface of the finger and thumb stalls in a manner to enable removal thereof when desired so that the glove can be used in a conventional manner and laundered if desired with each projection being mounted on a sleeve-like member telescoped over the finger or thumb stall with "Velcro" fastening arrangements or equivalent fastening arrangements being used to detachably secure the sleeve-like member to the finger and thumb stalls.

4 Claims, 1 Drawing Sheet

GARDENING GLOVE WITH ATTACHED FINGERTIP CUPS

BACKGROUND OF THE INVENTION

Field of the Invention

The present invention generally relates to a gardening glove which snugly fits on the hand with each finger and thumb stall including rigid cup-like or claw-like projections generally configured to simulate long fingernails which project beyond the tip ends of the finger and thumb stalls for effectively digging in the soil around desired plants in order to remove undesirable weeds and the like and to aerate the soil. The hard, rigid projections are attachable to the exterior surface of the finger and thumb stalls in a manner to enable removal thereof when desired so that the glove can be used in a conventional manner and laundered if desired with each projection being mounted on a sleeve-like member telescoped over the finger or thumb stall with "Velcro" fastening arrangements or equivalent fastening arrangements being used to detachably secure the sleeve-like member to the finger and thumb stalls.

INFORMATION DISCLOSURE STATEMENT

Weeding, cultivating and aerating the soil around plant seedlings, such as flower plants, vegetable plants and the like, has been accomplished in various ways including the use of various types of hand implements such as hand tools with rigid hook-like tines which can be used to cultivate the soil. Frequently, weeds are pulled by hand and various cultivating techniques can be accomplished by using the fingertips. However, this results in the hands becoming soiled and dirt becoming lodged under the fingernails. Gardening gloves are frequently used to protect the hands when performing various gardening chores and some gloves have been provided with features which facilitate their use as gardening gloves. However, previously known devices are not the same as nor equivalent to this invention.

SUMMARY OF THE INVENTION

An object of the present invention is to provide a gardening glove having rigid cup-shaped, claw-like or fingernail-like projections on the tip ends thereof for use in cultivating soil, aerating soil and removing undesired plant growth from the soil adjacent plant seedlings, desirable plants, and the like in an efficient manner with the glove keeping the hand of the wearer free of soil and avoiding direct contact of the hand and fingers with the soil.

Another object of the invention is to provide a gardening glove in accordance with the preceding object in which the projections are mounted on a sleeve-like member telescoped over the finger and thumb stalls of the glove for a substantial distance from the tip end of the stalls with the sleeve-like member being constructed of substantially rigid material and reinforced with a lining and the projection is rigid and secured to a longitudinal surface at the tip end thereof which simulates the position of an elongated fingernail which projects beyond the tip end of the sleeve-like member.

A further object of the present invention is to provide a gardening glove in accordance with the preceding objects in which the sleeve-like member includes projecting tabs along opposed edges thereof which overlie a longitudinal portion of opposed portions of the finger and thumb stalls with the tabs being detachably secured to the stalls by detachable fastening arrangements such as "Velcro" that securely anchors the sleeve-like member in place but enables removal thereof and use of the glove in a conventional manner.

Still another object of the invention is to provide a gardening glove in accordance with the preceding objects in which the projection is constructed to simulate a fingernail with the projecting end thereof being rounded and the inner end also being rounded to simulate a cuticle and having transverse curvature and the projecting rounded tip may be slightly downwardly curved to form a cup-shaped or claw-like configuration that closely simulates the appearance and configuration of a natural elongated fingernail. The projecting end of the simulated fingernail on the index finger is elongated and reversely curved to facilitate transplanting of seedlings.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
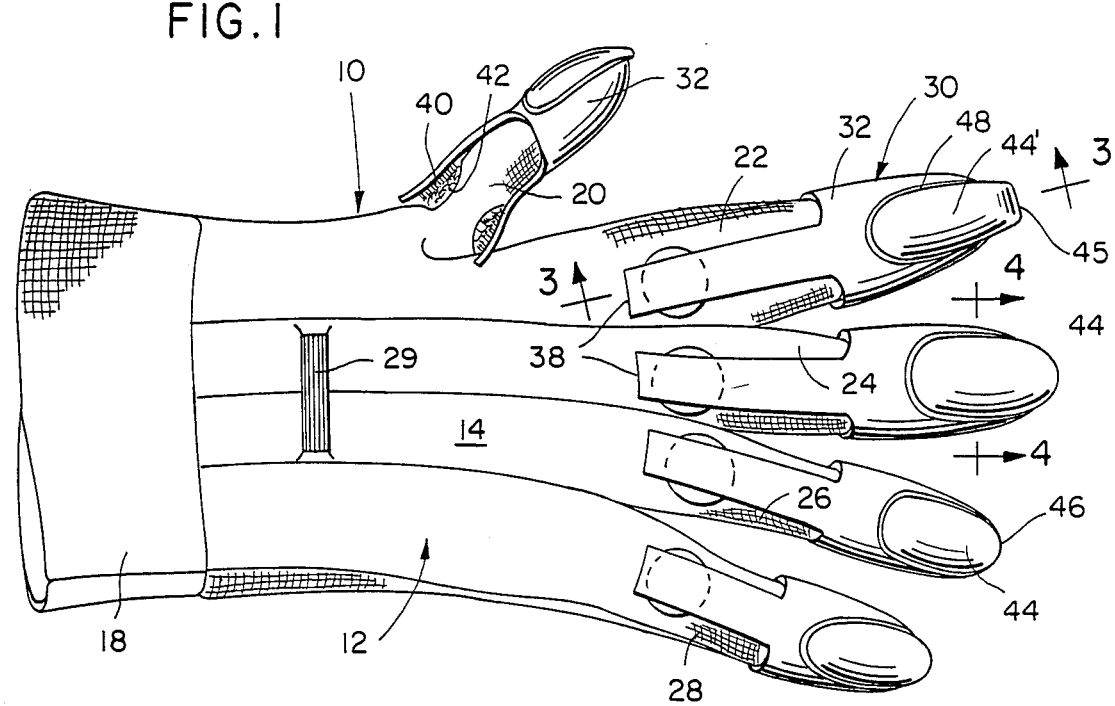
FIG. 1 is a plan view of the gardening glove from the backside.

Referring to the drawings, the gardening glove of the present invention is generally designated by reference numeral 10 and includes a main body 12 having a back portion 14 and a palm portion 16, a cuff portion 18, a thumb stall 20 and finger stalls 22, 24, 26 and 28 which represents conventional glove construction with these components being constructed of various types of fabric material such as cotton, polyester, blends of various natural and artificial yarn which is constructed in any suitable manner and which may include a resilient strap 29 on the back portion 14 to snug the body 12 around the hand or, in some instances, the cuff may be provided with a resilient construction in order to more effectively retain the glove in place. Gardening gloves 10 of this type are usually quite flexible and can be laundered and are relatively soft and comfortable to wear as compared to work gloves which are usually constructed of coarse canvas material, leather or other more rigid and long-wearing materials which are not usually intended to be laundered. However, the glove construction forming part of the present invention is conventional and may be any of many commercially available gardening gloves.

Each finger stall and the thumb stall is provided with an attachment generally designated by reference numeral 30 and which is in the form of a tubular or cylindrical sleeve-like member 32 constructed of flexible but somewhat rigid material that is waterproof and snugly fits the associated stall. Member 32 has a rounded outer end portion 34 which conforms with the tip end of the stall on which it is mounted in telescopic relation with the length of the sleeve-like member 32 being such that a substantial portion of the outer end of the stall will be covered with the length of the sleeve-like member 32 on the little finger stall being less than the length of the sleeve-like member 32 on the other finger and thumb stalls. The sleeve-like member 32 is preferably constructed of vinyl plastic or similar plastic materials, rubber and the like and is waterproof and soil proof. Also, sleeve-like member 32 includes a lining 33 of fabric material to provide additional strength and reinforcement and to prevent it from flexing excessively when digging as set forth hereinafter.

Figure 2:
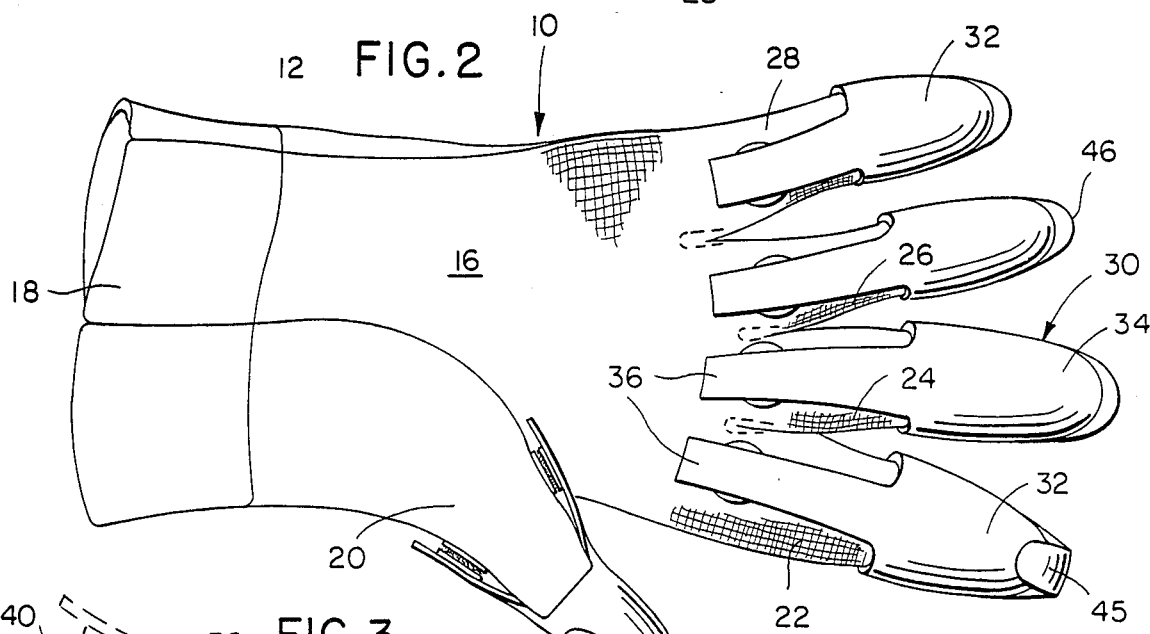
FIG. 2 is a plan view of the gardening glove from the palm side.
Figure 3:
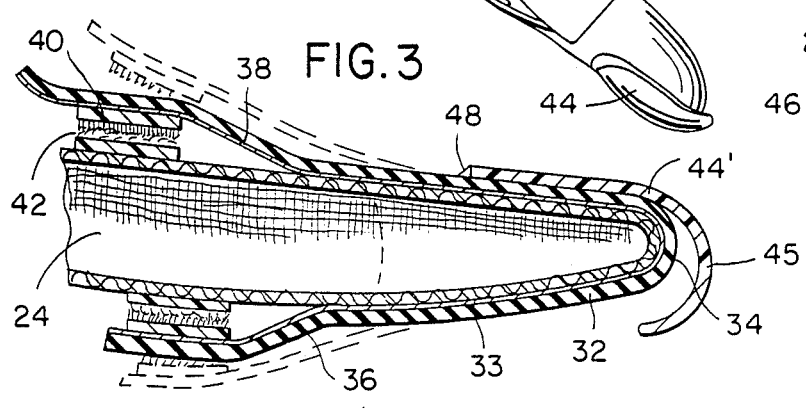
FIG. 3 is a longitudinal, sectional view, on an enlarged scale, taken substantially upon a plane passing along section 3—3 on FIG. 1 illustrating the manner in which the sleeve-like member is mounted on the index finger stall and illustrating the configuration of the rigid hook-shaped member mounted thereon.

The inner end of the sleeve-like member 32 is provided with a pair of diametrically opposed longitudinally extending tabs 36 and 38 which extend inwardly along the surface of the thumb and finger stalls as illustrated in FIGS. 1–3 with the tabs 36 and 38 extending along the palm and back surfaces, respectively, of the finger and thumb stalls as illustrated in FIGS. 1 and 2 with the tab 36 being slightly shorter than the tab 38 as illustrated in FIG. 3. Each of the tabs 36 and 38 includes a hook and loop patch 40 on the inner surface thereof adjacent the free end of the tabs with the patches 40 being aligned with and detachably engaged with hook and loop patches 42 mounted on the palm and back surfaces, respectively, of the finger and thumb stalls Hook and loop fasteners sold under the trademark "Velcro" are representative of the fasteners which may be used. The "Velcro" patches are secured in place by adhesive bonding or other securing means. When "Velcro" is used, it is desirable that the softer and more flexible loop pile patch be attached to the glove and the more rigid hook pile to be attached to the sleeve-like member so that when the sleeve-like member is removed, the glove finger stalls and thumb stall remain substantially flexible and also this facilitates laundering of the glove. Also, the tab 38 along the back of the finger and thumb stalls is longer than the tab 36 along the palm side so that the "Velcro" patches are not directly in alignment with the "Velcro" patch on the palm side of the stalls being spaced further from the inner end of the stall, whereas the outer "Velcro" patch on the back of the stall is closer to the main body 12 of the glove and is closer to alignment with the outer surface of the innermost knuckle on the fingers and thumb of the hand when the glove is installed thus facilitating the flexing of the finger and thumb stalls when the attachments 30 are installed thereon and also enhancing the flexibility of the stalls when the attachments are not in position on the glove.

Figure 4:
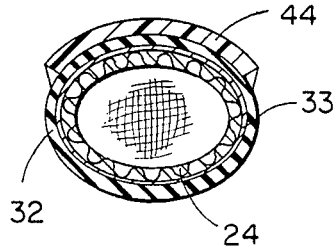
FIG. 4 is a transverse, sectional view, on an enlarged scale, taken substantially upon a plane passing along section line 4—4 on FIG. 1 illustrating the transverse configuration of the simulated fingernail and its association with the sleeve-like member.

Mounted on the outer end surface of each of the sleeve-like members 32 is a rigid cup-like or claw-like member 44 having the general configuration and appearance of a fingernail including a rounded or pointed outer end 46 which projects outwardly beyond the tip 34 of the finger or thumb stall on which it is mounted with the tip end 46 of the rigid member 44 being curved downwardly toward the palm side of the finger or thumb stall as illustrated in FIG. 3. Also, each rigid member 44 has a transverse curvature with the transverse configuration of both the sleeve-like member 32 and the rigid member 44 being illustrated in FIG. 1. This configuration rigidifies the member 44 and provides a structure which actually simulates the appearance characteristics of an elongated natural fingernail or an artificial fingernail. The rigid member 44' on the index finger is elongated and reversely curved at its tip end 45 as illustrated in FIG. 3. This member 44 is adapted to effectively transplant seedlings into a permanent site without touching, breaking or bruising them. This is accomplished by inserting the elongated curved tip 45 under the seedling and lifting it out of the seed bed and placing it in its permanent soil without damage to the seedling. The rigid member 44 may be constructed of metal, plastic or any other lightweight strong material and may, if desired, be colored or painted with fingernail polish or the like to enhance the appearance characteristics of the glove. The inner end of the rigid member 44 is also curved and configured similar to the cuticle area of a natural fingernail. The members 44 are permanently affixed to the outer surface of the outer end portion of the sleeve-like member 32 by adhesive bonding as at 48. The adhesive bonding 48 may involve a rigid bonding material and may include a bead of reinforcing glue around the outside of the nail as illustrated in FIGS. 1, 3 and 4 and this bead of reinforcing glue may also extend under the tip of the simulated fingernail or rigid member 44 to keep dirt from getting under and clogging the underside portion of the projecting tip 46 of the rigid member 44. The sleeve-like member 32 is constructed of one piece of material such as heavy duty rubber, vinyl plastic or the like which is waterproof and of sufficient thickness to effectively support the rigid member 44 and the "Velcro" patches. The lining 33 snugly engages the finger or thumb stall thereby reducing the tendency of the stalls to flex when the nails 44 are pulled during use.

As indicated previously, the "Velcro" patches on the palm side of the glove are located just outwardly of the first knuckle joint of the fingers and thumb and just inwardly of the second knuckle joint in the palm side of the fingers and thumb. The "Velcro" patches on the outer surface of the stalls are generally located in the same area but closer to the first knuckles. If desired, a flexible strip of material similar to that used in making the sleeve member may be wrapped around the inner ends of the tabs and stall on which they are mounted with the ends secured together by overlapping "Velcro" strips, thereby further anchoring the tabs 36 and 38 in place. Also, the rigid members 44 may be unitarily constructed with the sleeve-like members 32 with the members 44 and adjacent portions of the sleeve-like member 32 having appropriate reinforcement for rigidity and strength.

The gardening glove provides an effective device to enable a person to do gardening by cultivating the soil, aerating the soil, removing weeds and the like from around desired plants without coming into direct contact with the soil and without soiling the hands and without getting dirt under the fingernails. Also, the glove acts as a protector for the entire hand as in a conventional glove and this device also protects the existing natural fingernails from damage which frequently occurs when digging in the dirt with the hands and even when using hand-held tools thereby reducing the incidents of broken and split natural fingernails and reducing the deleterious effects of soil and other organic and inorganic matter coming into contact with the hands and fingers.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A gardening glove comprising a main body including a palm covering portion and a back portion covering the back of the hand and a cuff portion enabling insertion of the hand into the glove, said main body including a thumb stall and finger stalls extending therefrom for receiving the thumb and fingers of a wearer, an attachment for at least one of the thumb and finger stalls, said attachment including a rigid member attached to the stall and projecting Iongitudinally outwardly from the outer tip end thereof to provide a rigid, claw-like projection for digging, cultivating and aerating the soil adjacent desirable plants, each of said thumb and finger stalls being provided with an attachment, each of said attachments including a sleeve-like member having a closed outer tip end and an open end telescopically received on the outer end portion of the glove stall and said rigid member forming the claw-like projection being mounted on the external surface of the sleeve-like member and projecting outwardly beyond the tip end of the sleeve-like member, said rigid member being mounted on the portion of the sleeve-like member overlying the natural fingernail and simulating a fingernail in shape and configuration, said rigid member being transversely curved and projecting beyond the tip of the sleeve-like member and curving inwardly to provide a cup shaped, claw-like projection, said sleeve-like member being constructed of waterproof material to protect the tip end of the stalls and the thumb and fingers positioned therein from soil, the open end of the sleeve-like member being provided with a pair of diametrically opposed longitudinally extending tabs extending along the back and palm surface of the glove stall and means securing the free end of the tabs to the glove stalls.

2. The structure as defined in claim 1 wherein said means securing the tabs to the glove stalls includes hook and loop patches secured to the stalls and tabs for separable fastening to enable removal and replacement of the sleeve-like members for laundering the glove and interchanging sleeve-like members.

3. A gardening glove comprising a main body including a palm covering portion and a back portion covering the back of the hand and a cuff portion enabling insertion of the hand into the glove, said main body including a thumb stall and finger stalls extending therefrom for receiving the thumb and fingers of a wearer, an attachment for at least one of the thumb and finger stalls, said attachment including a sleeve-like member having a closed outer tip end and an open inner end telescopically received on the outer end portion of the glove stall and a rigid member mounted on the external surface of the sleeve-like member and projecting outwardly beyond the tip end of the sleeve-like member to form a claw-like projection, said rigid member being mounted on the portion of the sleeve-like member overlying the natural fingernail, the open end of the sleeve-like member being provided with a pair of diametrically opposed longitudinally extending tabs extending along the back and palm surface of the glove stall and releasable means detachably securing the free end of the tabs to the glove stall.

4. The structure as defined in claim 3 wherein said means securing the tabs to the glove stall includes patches of hook and loop pile fasteners secured to the stall and tabs for separable fastening to enable removal and replacement of the sleeve-like member for laundering the glove and interchanging the sleeve-like members, said rigid member being transversely curved and projecting beyond the tip of the sleeve-like member, the outer end of the rigid member curving inwardly to provide a reversely-curved, cup shaped claw-like projection.

* * * * *